United States Patent [19]
Mizui

[11] Patent Number: 5,901,236
[45] Date of Patent: May 4, 1999

[54] METHOD AND APPARATUS FOR MEASURING POSITION BY IMAGE PROCESSING

[75] Inventor: Seiichi Mizui, Odawara, Japan

[73] Assignee: Komatsu Ltd., Tokyo, Japan

[21] Appl. No.: 08/936,555

[22] Filed: Sep. 24, 1997

[30] Foreign Application Priority Data

Sep. 24, 1996 [JP] Japan .................................... 8-251601

[51] Int. Cl.$^6$ .............................. G01T 5/50; G01C 21/00
[52] U.S. Cl. ........................... 382/104; 382/103; 382/291
[58] Field of Search .................................... 382/103, 104, 382/106, 151, 154, 173, 291; 434/4; 345/358; 348/94, 95, 118, 119, 120; 701/207, 300–302; 356/375; 250/559.29, 559.33; 901/47; 340/903, 435, 958

[56] References Cited

U.S. PATENT DOCUMENTS

| | | | |
|---|---|---|---|
| 4,146,924 | 3/1979 | Birk et al. | 364/513 |
| 4,219,847 | 8/1980 | Pinkney et al. | 358/126 |
| 4,281,342 | 7/1981 | Ueda et al. | 358/93 |
| 4,396,945 | 8/1983 | DiMatteo et al. | 358/107 |
| 4,488,172 | 12/1984 | Hutchin | 358/107 |
| 4,626,995 | 12/1986 | Lofgren et al. | 364/424 |
| 4,769,700 | 9/1988 | Pryor | 358/107 |
| 4,853,771 | 8/1989 | Witriol et al. | 358/93 |
| 4,858,132 | 8/1989 | Holmquist | 364/424.02 |
| 4,937,878 | 6/1990 | Lo et al. | 382/103 |
| 5,196,900 | 3/1993 | Pettersen | 356/141 |
| 5,477,459 | 12/1995 | Clegg et al. | 364/460 |
| 5,673,082 | 9/1997 | Wells et al. | 348/139 |
| 5,793,630 | 8/1998 | Theimer et al. | 364/140.01 |

FOREIGN PATENT DOCUMENTS 6-176143  6/1994  Japan .

OTHER PUBLICATIONS

Ferrell et al., An Asynchronous Modulation/Demodulation Technique for Robust Identification of a Target for 3–D Pose Determination, SPIE vol. 2755, pp. 484–489, Jul. 1996.

Want et al., Active Badges and Personal Interactive Computing Objects, IEEE Transactions on Comsumer Electronics, vol. 38, No. 1, pp. 10–20, Feb. 1992.

Maddocks, Live Animation From Real–World Images: The Poetry of Motion, Advanced Imaging, vol. 9, No. 7, pp. 36–40, Jul. 1994.

Bianchi et al., The COSTEL System for Human Motion Measurement and Analysis, SPIE vol. 1356, pp. 38–50, 1990.

Hemmi et al., 3–D Natural Interactive Interface—Using Marker Tracking from a Single View, Systems and Computers in Japan, vol. 23, No. 11, pp. 62–73, 1992.

Applewhite et al., A Survey of Position Trackers, Presence vol. 1, No. 2, pp. 173–200, 1992.

Mecellari, CoSTEL: A Computer Peripheral Remote Sensing Device for 3–Dimensional Monitoring of Human Motion, Medical & Biological Engineering & Computing, No. 21, pp. 311–318, May 1983.

*Primary Examiner*—Leo H. Boudreau
*Assistant Examiner*—Brian P. Werner
*Attorney, Agent, or Firm*—Diller, Ramik & Wight, PC

[57] ABSTRACT

An object whose position is to be measured is provided with a light-emitting element, the luminance of the light-emitting element is varied in two levels (lit/extinguished) with a prescribed period, images of four consecutive frames are successively acquired, one frame being an image picked up in a time of ¼ of the period of this variation of luminance, of the four consecutive frames, a first difference image of the first frame and third frame and a second difference image of the second frame and fourth frame are acquired, and, of the first difference image and second difference image, the difference image of greatest lightness is selected. This selected difference image is always the difference image between the image during the lit period of the light-emitting element and the image during the extinguished period. Pixels whose lightness is greater than a prescribed threshold value in this selected difference image is detected as the position of the light-emitting element, and the position relative to the object is thereby calculated.

4 Claims, 3 Drawing Sheets

METHOD AND APPARATUS FOR MEASURING POSITION BY IMAGE PROCESSING

BACKGROUND OF THE INVENTION

1. Field of the Invention

The present invention relates to a method and apparatus for measuring position by image processing whereby the relative position of an object whereon a light-emitting element is arranged is measured by detecting the position of the light-emitting element on an image and using the detected position of the light-emitting element.

2. Description of the Related Art

When loading a load from an unmanned loader onto an unmanned dump truck at an outdoors work site, it is necessary to ascertain the precise position of the unmanned dump truck. For this purpose, the image of a specific portion of the dump truck (object) is picked up by means of a camera mounted at the unmanned loader, and the results of this image pick-up process are used to determine the precise position of the dump-truck.

In a well known example of such technique, a light-emitting element is mounted on a specific portion of an object whose position is to be measured in order to facilitate identification of the position of the object; the image of the object and around it is picked up by a camera; the picked-up image is processed to convert it into light/dark binary form; position of high lightness is found as the position of the object (light-emitting element) on the screen; and the relative position of the object with respect to the camera is thereby measured.

The above-mentioned method that picks up the image of the background around the object together with the light-emitting element can be adopted with no problem indoors or in an outdoor site whose lightness environment is stable. However, in an outdoor environment where there are large fluctuations of ambient lightness, precise detection of the position of the light-emitting element in the picked-up image i.e. the position of the object has sometimes proved impossible. That is, even though the threshold level for identifying locations of high lightness on the image is set while considering the background lightness, fluctuation of the background lightness may cause high lightness portions of the background to be erroneously detected as the location of the light-emitting element.

In order to avoid the effect of fluctuation of the background lightness, Japanese Patent Publication (Kokai) No. 6-176143 discloses a technique of measuring the position of an object in which an image of the object is picked up by a camera in two consecutive frames each for a prescribed time and a difference image is acquired from these two frames. Then, the difference image is processed to convert it into binary form and the position of the object is measured based on the binirized difference image.

However, this published technique does not disclose that a light-emitting element is provided on the object. Further, the purpose of the published technique is to detect the movement of a moving object. With this published technique also, just as with the technique described above, noise is likely to generate in the processing system due to fluctuations of ambient lightness, and therefore, stable processing results could not be obtained.

SUMMARY OF THE INVENTION

An object of the present invention is to provide a method and apparatus for measuring position by image processing that enables precise measurement of the position of an object (for example a dump truck) even when measurement is performed outdoors under such conditions of severe fluctuation of lightness.

According to a main aspect of the present invention, there is provided a method of measuring position by image processing in which an image of a light-emitting element arranged on an object whose position is to be measured is picked up by image pickup means, the position of the light-emitting element on the image picked up by the image pickup means is detected, and the relative position of the object with respect to the image pickup means is measured using the detected position of the light-emitting element, comprising a luminance change step of alternately changing luminance of the light-emitting element in two levels with a prescribed period; a frame processing step of successively acquiring images of four consecutive frames, an image of one frame being an image picked up by the image pickup means in a time of ¼ of the period of the luminance change; a difference processing step of acquiring from the four consecutive frames a first difference image of the first frame and the third frame and a second difference image of the second frame and the fourth frame; a selection step of selecting a difference image of greatest lightness of the first difference image and the second difference image; and a position detection step of detecting pixels of lightness greater than a prescribed threshold value in the difference image selected in the selection step as the position of the light-emitting element.

Specifically, as shown in FIG. 3, the luminance of the light-emitting element (LED) is varied in two steps (lit/extinguished), with a prescribed period (66.6 msec*2); taking the images picked up at times of ¼ (33.3 msec) of the period of this change of luminance as one frame, images of four consecutive frames are successively acquired; of these four consecutive frames, a first difference image of the first frame #1 and the third frame #3 and a second difference image of the second frame #2 and the last frame #4 are acquired and, of the first difference image and second difference image, the difference image of greatest lightness is selected; this selected difference image (the second difference image in the case of FIG. 3) is therefore always the difference image of the image (frame #2) at the time when the light-emitting element was lit (time-point t2) and the image (frame #4) at the time when it was extinguished (time-point t4). That is, in this selected difference image, noise etc. due to fluctuation of the background lightness is eliminated and the position of the light-emitting element is detected in stable fashion as the position of greatest lightness difference. The position relative to the object can therefore be precisely calculated by detecting the portion of pixels whose lightness is above the prescribed threshold value in this selected difference image as being the position of the light-emitting element.

DESCRIPTION OF THE PREFERRED EMBODIMENTS

An embodiment of a method and apparatus for measuring position by image processing according to the present invention is described below with reference to the accompanying drawings.

Figure 4:
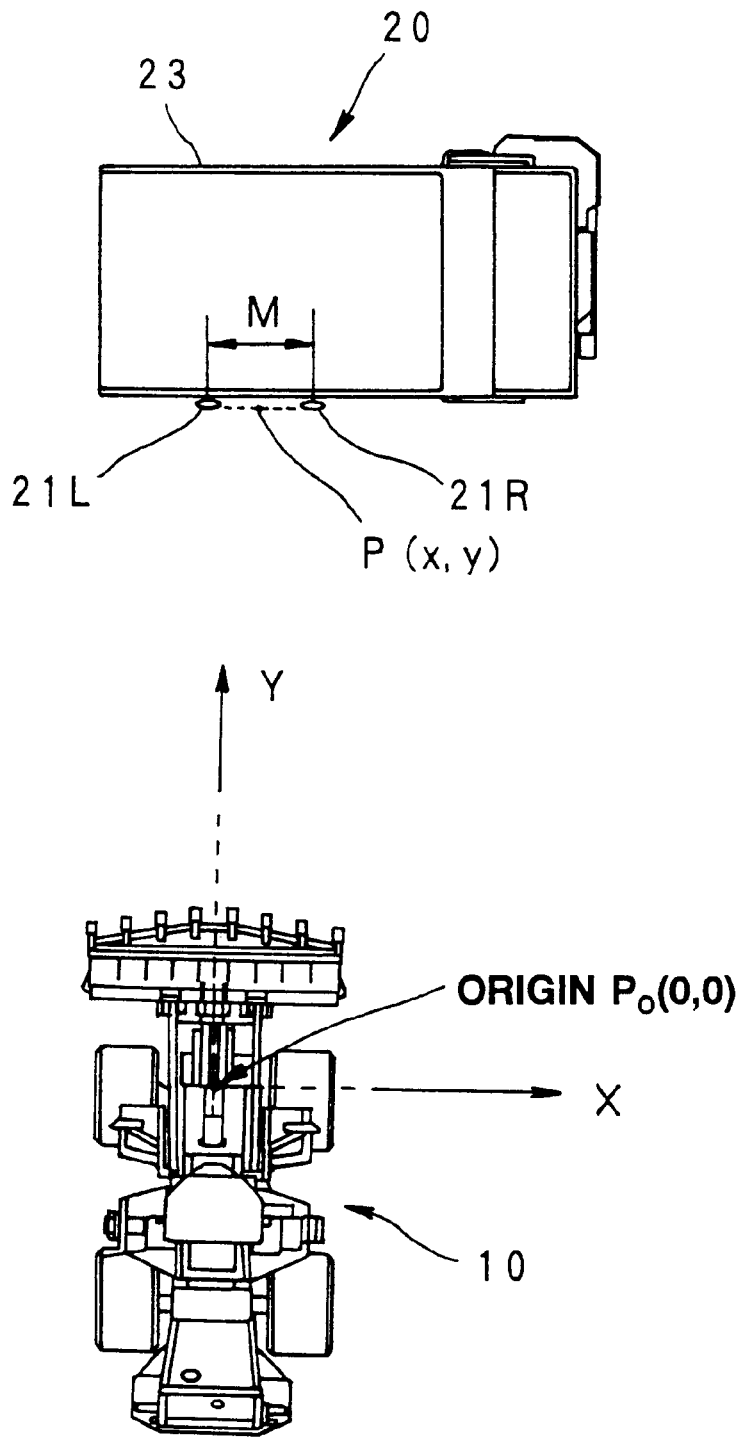
FIG. 4 is a top view of a site where an unmanned loader and an unmanned dump truck to which the embodiment is applied are located.

As shown in FIG. 4, the present embodiment is assumed to be applied to the operations of loading a load onto an unmanned dump truck 20 from an unmanned loader 10 at an outdoor site.

When such a loading operation is performed, in order to approach the unmanned loader 10 to the unmanned dump truck 20, it is necessary to know, at the loader 10, the relative position of the dump truck 20 with respect to the loader 10.

Figure 2:
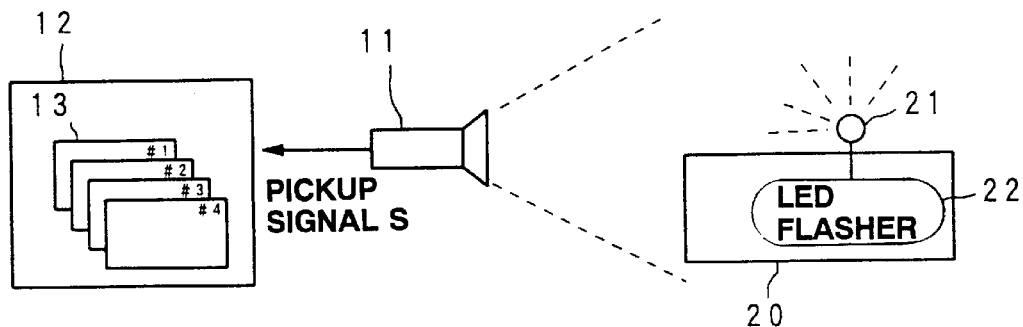
FIG. 2 is a block diagram illustrating the embodiment of a position measurement apparatus using image processing in accordance with the present invention.

Referring to FIG. 2, an apparatus for measuring the relative position of the dump truck 20 with respect to the loader 10 comprises a CCD camera 11 for picking up an image, an image processing unit 12 mounted on loader 10, and an LED (light-emitting diode) 21 and an LED flashing unit 22 mounted on dump truck 20.

Figure 3:
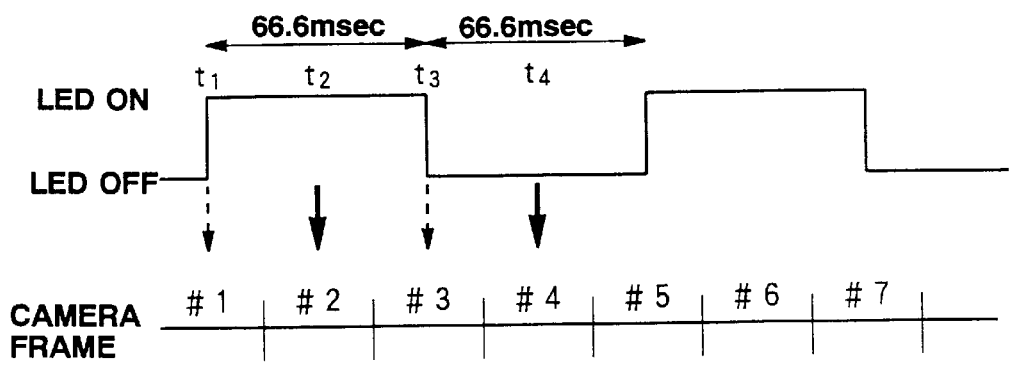
FIG. 3 is a time-chart explaining the embodiment.

Referring to FIG. 4, on the side face of a vessel 23 of dump truck 20, LEDs 21L and 21R are arranged to left and right with a prescribed separating distance M. These LEDs 21L and 21R are driven by the LED flashing unit 22 so that they flash with a prescribed period of (66.6 msec * 2) as shown in FIG. 3.

As shown in FIG. 4 in which the CCD camera 11 is assumed to be mounted on loader 10 at the origin $P_o(0, 0)$ of the X-Y co-ordinate system, and the intermediate position of the two LEDs 21L and 21R is assumed to be the co-ordinate position P(x, y), the relative position (x, y) of a specified position P of dump truck 20 with respect to the CCD camera 11 can be found as follows.

Suppose that camera 11 picks up an image of the two LEDs 21L and 21R, and the positions of LEDs 21L and 21R on this image that has been picked up are detected as (a, b), (c, d) respectively. Then, the separating distance k of the LEDs in the image is as follows.

$$k = \sqrt{((a-c)^2 + (b-d)^2)} \quad (1)$$

If then the focal distance of camera 11 is taken as f, the actual distance L of the object from a specified position P(x, y) can be found as follows.

$$L = M*f/k \quad (2)$$

where M is a distance between two LEDs.

This L corresponds to the relative position y on the Y axis.

Further, assuming that the image is of 512 * 512 pixels, the distance on the image in the X-axis direction is:

$$(a+c)/2 - 256$$

Thus, the relative position x on the X axis is:

$$x = ((a+c)/2 - 256)*L/f \quad (3)$$

In this manner, from the positions (a, b) and (c, d) of LEDs 21L and 21R on the image, the relative position (x, y) of the specified position P of dump truck 20 with respect to camera 11 is calculated. A drive control unit mounted on the loader then uses this calculated position to bring the loader 10 up to the dump truck 20 and perform the loading operation.

Figure 1:
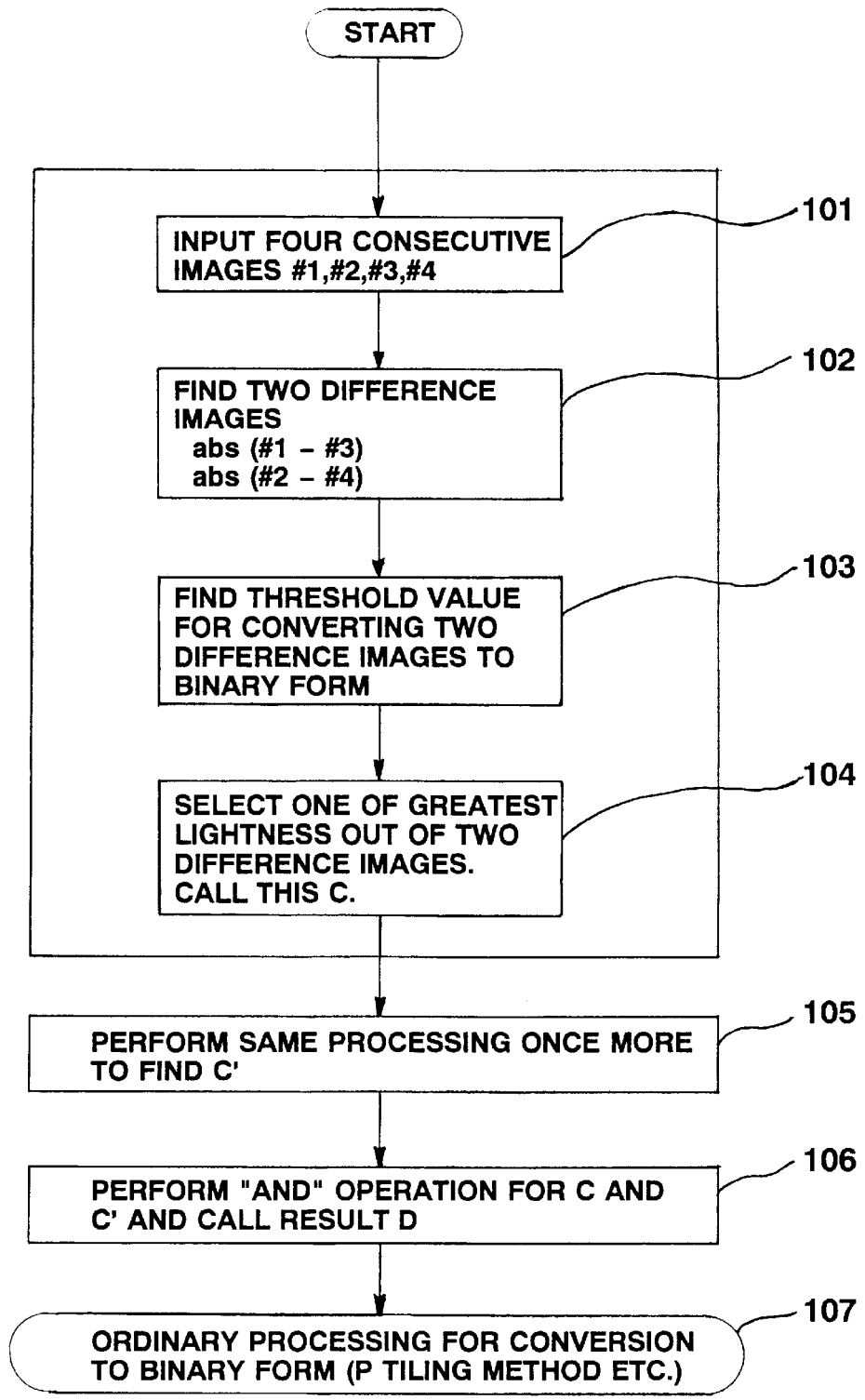
FIG. 1 is a flowchart that explains an embodiment of a method of position measurement using image processing according to the present invention, and illustrates the processing procedure performed by the image processing unit shown in FIG. 2.

FIG. 1 is a flowchart given in explanation of the processing up to detection of the positions (a, b), (c, d) of LEDs 21L and 21R on the image as mentioned above. This processing is executed in image processing unit 12 of FIG. 2.

The flowchart will now be described with reference to the time chart of FIG. 3.

Firstly, image pickup signal S that has been picked up from the side face of vessel 23 of dump truck 20 by camera 11 is input. As shown in FIG. 2, image processing unit 12 incorporates a frame memory 13 that stores four consecutive frames. Here, an image that is picked up during ¼ of the flashing period of LEDs 21L and 21R (i.e. 33.3 msec: see FIG. 3) is taken as one frame. Image processing unit 12 successively inputs the images of four consecutive frames (frame #1, #2, #3, #4), and stores these in frame memory 13 (step 101).

Then, of these four consecutive frames, the absolute value abs (#1–#3) of the first difference image obtained from first frame #1 and third frame #3 and the absolute value abs (#2–#4) of the second difference image obtained from second frame #2 and fourth frame #4 are extracted (step 102).

A threshold value for converting to binary form the lightness of the pixels on the two difference images is then set up (step 103) and the difference images are converted to binary form using this threshold value.

Then, from the results of this conversion to binary form, of the absolute value abs (#1–#3) of the first difference image and the absolute value abs (#2–#4) of the second difference image, the difference image C of greatest lightness is selected (step 104).

In this embodiment (FIG. 3), the absolute value abs (#2–#4) of the second difference image is selected as difference image C of greatest lightness. As shown in FIG. 3, this difference image C of greatest lightness is normally the difference image of the frame #2 in the lit condition of the LEDs (time-point t2) and the frame #4 in the extinguished condition (time-point t4) instead of being obtained using either the frame #1 of the changeover (time-point t1) from the extinguished condition of the LEDs to the lit condition or the frame #3 of the changeover (time-point t3) from the lit condition to the extinguished condition. Consequently, in this selected difference image C, noise etc. created by fluctuation of the lightness of the background is eliminated and the positions of LEDs 21L and 21R can be stably detected as the positions of greatest difference of lightness. Furthermore, since the frames do not need to be synchronized with lighting or extinction of the LEDs, frame changeover processing can be performed in a straightforward manner without reference to the timing of LED lighting or extinction.

Since the noise of the system can easily be responded to by use of a single difference image C, the processing (steps 101–104) is repeated once more aimed at elimination of such system noise to acquire a difference image C' (step 105), and processing is performed on these difference images C, C' to acquire a difference image D. In this case, by AND processing is meant that, in respect of pixels at identical positions of difference image C and difference image C', the pixels of least lightness are selected. That is, since the pixels of least lightness of pixels at identical positions are selected, noise is eliminated and the positions of LEDs 21L and 21R in image D can be detected precisely (step 106).

Next, portions of the pixels whose lightness is above a prescribed threshold value in difference image D are detected as being the position (a, b) of LED 21L and the position (c, d) of LED 21R (step 107).

With the embodiment as described above, even when work is carried out outdoors under conditions of severe fluctuation of lightness, the position of an object (for example dump truck 20) can be precisely detected. As a result, the position relative to the object can be calculated precisely and the work can be accurately carried out.

In this embodiment, the LEDs were lit and extinguished. However, it would be possible to have the luminance of the LEDs change in 2 levels without extinguishing the LEDs.

What is claimed is:

1. A method of measuring position by image processing in which an image of a light-emitting element arranged on an object whose position is to be measured is picked up by image pickup means, the position of the light-emitting element on the image picked up by the image pickup means is detected, and the relative position of the object with respect to the image pickup means is measured using the detected position of the light-emitting element, comprising:

a luminance change step of alternately changing luminance of the light-emitting element in two levels with a prescribed period;

a frame processing step of successively acquiring images of four consecutive frames, an image of one frame being an image picked up by the image pickup means in a time of ¼ of the period of the luminance change;

a difference processing step of acquiring from the four consecutive frames a first difference image of the first frame and the third frame and a second difference image of the second frame and the fourth frame;

a selection step of selecting a difference image of greatest lightness out of the first difference image and the second difference image; and a position detection step of detecting pixels of lightness greater than a prescribed threshold value in the difference image selected in the selection step as the position of the light-emitting element.

2. The method of measuring position by image processing according to claim 1, wherein the image pickup means is mounted on a moving body, the method further comprising a control step of calculating the relative position of the object with respect to the image pickup means by using the position of the light-emitting element on the difference image detected in the position detection step and controlling movement of the moving body in accordance with the result of the calculation.

3. An apparatus for measuring position by image processing in which an image of a light-emitting element arranged on an object whose position is to be measured is picked up by image pickup means, the position of the light-emitting element on the image picked up by the image pickup means is detected, and the relative position of the object with respect to the image pickup means is measured using the detected position of the light-emitting element, comprising:

luminance change means for alternately changing luminance of the light-emitting element in two levels with a prescribed period;

frame processing means for successively acquiring images of four consecutive frames, an image of one frame being an image picked up by the image pickup means in a time of ¼ of the period of the luminance change;

difference processing means for acquiring from the four consecutive frames a first difference image of the first frame and the third frame and a second difference image of the second frame and the fourth frame;

selection means for selecting a difference image of greatest lightness out of the first difference image and the second difference image; and position detection means for detecting pixels of lightness greater than a prescribed threshold value in the difference image selected by the selection means as the position of the light-emitting element.

4. The apparatus for measuring position by image processing according to claim 3, wherein the image pickup means is mounted on a moving body, the apparatus further comprising control means for calculating the relative position of the object with respect to the image pickup means by using the position of the light-emitting element on the difference image detected by the position detection means and controlling movement of the moving body in accordance with the result of the calculation.

* * * * *